(12) United States Patent
Thurber et al.

(10) Patent No.: US 6,843,815 B1
(45) Date of Patent: Jan. 18, 2005

(54) COATED ABRASIVE ARTICLES AND METHOD OF ABRADING

(75) Inventors: Ernest L. Thurber, Woodbury, MN (US); Don H. Kincaid, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/655,195

(22) Filed: Sep. 4, 2003

(51) Int. Cl.$^7$ .............................. B24D 3/00; B24D 3/28
(52) U.S. Cl. ........................ 51/298; 51/295; 51/307; 51/308; 51/309; 451/28
(58) Field of Search .......................... 51/307, 308, 309, 51/298, 295; 451/28

(56) References Cited

U.S. PATENT DOCUMENTS

| | | |
|---|---|---|
| 3,989,610 A | 11/1976 | Tsukada et al. |
| 4,314,827 A | 2/1982 | Leitheiser et al. |
| 4,396,657 A | 8/1983 | Ibrahim |
| 4,518,397 A | 5/1985 | Leitheiser et al. |
| 4,524,181 A | 6/1985 | Adam et al. |
| 4,588,419 A | 5/1986 | Caul et al. |
| 4,601,973 A | 7/1986 | Bauer |
| 4,623,364 A | 11/1986 | Cottringer et al. |
| 4,652,275 A | 3/1987 | Bloecher et al. |
| 4,734,104 A | 3/1988 | Broberg |
| 4,737,163 A | 4/1988 | Larkey |
| 4,744,802 A | 5/1988 | Schwabel |
| 4,751,138 A | 6/1988 | Tumey et al. |
| 4,770,671 A | 9/1988 | Monroe et al. |
| 4,799,939 A | 1/1989 | Bloecher et al. |
| 4,833,204 A | 5/1989 | Yusa et al. |
| 4,881,951 A | 11/1989 | Wood et al. |
| 4,927,431 A | 5/1990 | Buchanan et al. |
| 4,997,717 A | 3/1991 | Rembold et al. |
| 5,011,508 A | 4/1991 | Wald et al. |
| 5,078,753 A | 1/1992 | Broberg et al. |
| 5,086,088 A | 2/1992 | Kitano et al. |
| 5,090,968 A | 2/1992 | Pellow |
| 5,108,463 A | 4/1992 | Buchanan |
| 5,139,978 A | 8/1992 | Wood |
| 5,152,917 A | 10/1992 | Pieper et al. |
| 5,178,646 A | 1/1993 | Barber, Jr. et al. |
| 5,201,916 A | 4/1993 | Berg et al. |
| 5,203,884 A | 4/1993 | Buchanan et al. |
| 5,227,104 A | 7/1993 | Bauer |
| 5,256,170 A | 10/1993 | Harmer et al. |
| 5,328,716 A | 7/1994 | Buchanan |
| 5,360,462 A | 11/1994 | Harmer et al. |
| 5,366,523 A | 11/1994 | Rowenhorst et al. |
| 5,378,251 A | 1/1995 | Culler et al. |
| 5,417,726 A | 5/1995 | Stout et al. |
| 5,429,647 A | 7/1995 | Larmie |
| 5,436,063 A | 7/1995 | Follett et al. |
| 5,451,446 A | 9/1995 | Kincaid et al. |
| 5,496,386 A | 3/1996 | Broberg et al. |
| 5,498,269 A | 3/1996 | Larmie |
| 5,505,747 A | 4/1996 | Chesley et al. |
| 5,520,711 A | 5/1996 | Helmin |
| 5,549,962 A | 8/1996 | Holmes et al. |
| 5,551,963 A | 9/1996 | Larmie |
| 5,556,437 A | 9/1996 | Lee et al. |
| 5,560,753 A | 10/1996 | Schnabel et al. |
| 5,565,011 A | 10/1996 | Follett et al. |
| 5,573,619 A | 11/1996 | Benedict et al. |
| 5,578,343 A | 11/1996 | Gaeta et al. |
| 5,609,706 A | 3/1997 | Benedict et al. |
| 5,766,277 A | 6/1998 | DeVoe et al. |
| 5,863,847 A | 1/1999 | De Voe et al. |
| 5,922,784 A * | 7/1999 | DeVoe et al. ............... 522/165 |
| 5,942,015 A | 8/1999 | Culler et al. |
| 5,954,844 A | 9/1999 | Law et al. |
| 5,961,674 A | 10/1999 | Gagliardi et al. |
| 5,964,979 A | 10/1999 | George et al. |
| 5,975,988 A | 11/1999 | Christianson |
| 6,001,936 A | 12/1999 | Barrera et al. |
| 6,077,601 A | 6/2000 | DeVoe et al. |
| 6,228,133 B1 | 5/2001 | Thurber et al. |
| 6,277,160 B1 | 8/2001 | Stubbs et al. |
| 6,287,669 B1 | 9/2001 | George et al. |
| 6,372,336 B1 * | 4/2002 | Clausen et al. ............. 428/323 |
| 6,565,969 B1 | 5/2003 | Lamon et al. |
| 6,572,971 B2 | 6/2003 | Martin |
| 6,582,487 B2 | 6/2003 | Larson et al. |
| 2001/0028953 A1 | 10/2001 | Bluem et al. |
| 2002/0170236 A1 | 11/2002 | Larson et al. |

FOREIGN PATENT DOCUMENTS

| | | |
|---|---|---|
| GB | 2 109 798 A | 6/1993 |
| WO | WO 2002/074492 A2 | 9/2002 |
| WO | WO 2002/074839 A3 | 9/2002 |
| WO | WO 2002/074839 A2 | 9/2002 |
| WO | WO 2003/033212 A1 | 4/2003 |

* cited by examiner

*Primary Examiner*—Michael Marcheschi

(57) ABSTRACT

A curable composition comprises epoxy resin preparable by reaction of epichlorohydrin with at least one of bisphenol A or bisphenol F, polyfunctional (meth)acrylate, dicyandiamide and photoinitiator. The curable composition is useful for preparing treated backings and coated abrasive articles.

15 Claims, 1 Drawing Sheet

COATED ABRASIVE ARTICLES AND METHOD OF ABRADING

BACKGROUND

In general, coated abrasive articles have abrasive particles secured to a backing. More typically, coated abrasive articles comprise a backing having two major opposed surfaces and an abrasive layer secured to a major surface. The abrasive layer typically comprises abrasive particles and a binder, wherein the binder serves to secure the abrasive particles to the backing.

One common type of coated abrasive article has an abrasive layer comprising a make layer, a size layer, and abrasive particles. In making such a coated abrasive article, a make layer comprising a first binder precursor is applied to a major surface of the backing. Abrasive particles are then at least partially embedded into the make layer (e.g., via electrostatic coating), and the first binder precursor is cured (i.e., crosslinked) to secure the particles to the make layer. A size layer comprising a second binder precursor is then applied over the make layer and abrasive particles, followed by curing of the binder precursors. Some coated abrasive articles further comprise a supersize layer covering the abrasive layer. The supersize layer typically includes grinding aids and/or anti-loading materials.

Another common type of coated abrasive article comprises an abrasive layer secured to a major surface of a backing, wherein the abrasive layer is provided by applying a slurry comprised of binder precursor and abrasive particles onto a major surface of a backing, and then curing the binder precursor.

Some coated abrasive articles further comprise a backing treatment such as a backsize layer (i.e., a coating on the major surface of the backing opposite the major surface having the abrasive layer), a presize layer, a tie layer (i.e., a coating between the abrasive layer and the major surface to which the abrasive layer is secured), and/or a saturant. Optionally, the backing may further comprise a subsize treatment. A subsize is similar to a saturant except that it is applied to a previously treated backing.

Conventional backing treatments used in coated abrasive constructions include resole phenolic resins, phenolic/latex blends, urea-formaldehyde, and melamine formaldehyde resins. Backing treatments such as these typically exhibit good adhesion to resole phenolic, urea-formaldehyde, and epoxy based make layers and slurry layers. However since these types of backing treatments are typically only partially cured prior to the make coat application, they typically emit various volatiles such as water, phenol, and formaldehyde that can impart additional porosity to the abrasive layer, particles and/or interfere with curing of the make layer.

During use, the temperature of coated abrasives typically rises due to frictional heating. Such heating may lead to problems such as the abrasive layer separating from the backing, whether the backing is treated or not. It would be desirable to have treated backings that can be included in coated abrasive articles, and have good adhesion to abrasive layers.

SUMMARY

In one aspect, the present invention provides a curable composition comprising, based on the total weight of components a) through e):
- a) from 50 to 90 percent by weight of at least one epoxy resin preparable by reaction of epichlorohydrin with at least one of bisphenol A or bisphenol F;
- b) from 1 to 20 percent by weight of polyfunctional (meth)acrylate;
- c) dicyandiamide;
- d) photoinitiator, and
- e) optional epoxy cure catalyst.

Compositions according to the present invention are useful, for example, in the manufacture of backings and coated abrasive articles.

In one aspect, the present invention provides a treated backing comprising a fabric having a composition contacting at least a portion thereof, wherein, based on the total weight of components a) through e), the composition comprises a reaction product of components comprising:
- a) from 50 to 90 percent by weight of at least one epoxy resin preparable by reaction of epichlorohydrin with at least one of bisphenol A or bisphenol F;
- b) from 1 to 20 percent by weight of polyfunctional (meth)acrylate;
- c) dicyandiamide;
- d) photoinitiator; and
- e) optional epoxy cure catalyst.

In one aspect, the present invention provides a method of making a treated backing comprising:
- contacting at least a portion of a fabric with a curable composition, based on the total weight of components a) through e), preparable from components comprising:
  - a) from 50 to 90 percent by weight of at least one epoxy resin preparable by reaction of epichlorohydrin with at least one of bisphenol A or bisphenol F;
  - b) from 1 to 20 percent by weight of polyfunctional (meth)acrylate;
  - c) dicyandiamide;
  - d) photoinitiator; and
  - e) optional epoxy cure catalyst; and
- at least partially curing the composition.

In one aspect, the present invention provides a coated abrasive article comprising a backing and abrasive layer, the abrasive layer comprising abrasive particles and at least one binder, wherein the binder comprises, based on the total weight of the components a) through e), a reaction product of components comprising:
- a) from 50 to 90 percent by weight of at least one epoxy resin preparable by reaction of epichlorohydrin with at least one of bisphenol A or bisphenol F;
- b) from 1 to 20 percent by weight of polyfunctional (meth)acrylate
- c) dicyandiamide;
- d) photoinitiator; and
- e) optional epoxy cure catalyst.

In one aspect, the present invention provides a coated abrasive article comprising a backing and an abrasive layer, further comprising at least one of a presize layer, a saturant, a subsize, a backsize layer, or a tie layer that comprising a binder that, based on the total weight of components a) through e), is a reaction product of components comprising:
- a) from 50 to 90 percent by weight of at least one epoxy resin preparable by reaction of epichlorohydrin with at least one of bisphenol A or bisphenol F;
- b) from 1 to 20 percent by weight of polyfunctional (meth)acrylate
- c) dicyandiamide;
- d) photoinitiator, and
- e) optional epoxy cure catalyst.

In one aspect, the present invention provides a method of abrading a workpiece comprising method of abrading a workpiece comprising:

provding a coated abrasive article according to present invention;

frictionally contacting at least a portion of the abrasive layer with at least a portion of the surface of the workpiece; and moving at least one of the coated abrasive article or the workpiece relative to the other to abrade at least a portion of the surface.

These and other aspects of the invention will be apparent from the detailed description below. In no event, however, should the above summaries be construed as limitations on the claimed subject matter, which subject matter is defined solely by the attached claims, as may be amended during prosecution.

As used herein:

the term "(meth)acryl" includes both acryl and methacryl; and any composition that is "essentially free of" a substance contains less than 1 percent by weight of that substance, based on the total weight of the composition.

DETAILED DESCRIPTION

Figure 1:
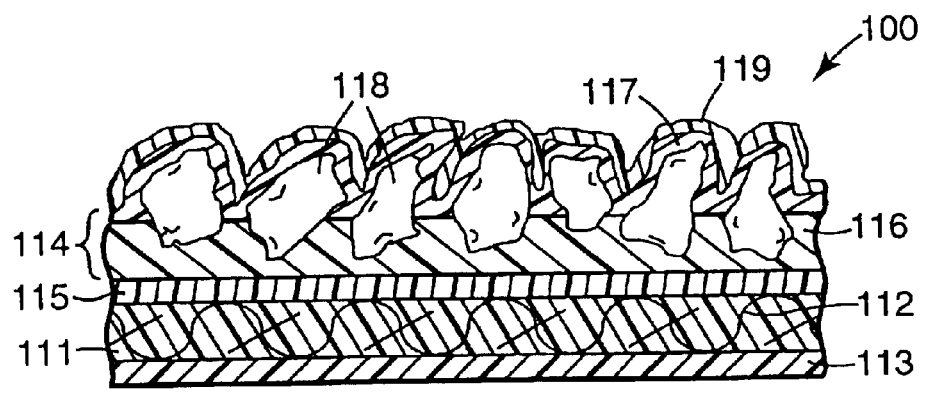
FIG. 1 is a cross-sectional side view of an exemplary coated abrasive article according to the present invention.

Curable compositions according to one aspect of the present invention, comprise from 50 to 90 percent by weight of at least one epoxy resin preparable by reaction of epichlorohydrin with at least one of bisphenol A or bisphenol F; from 1 to 20 percent by weight of polyfunctional (meth) acrylate; from 1 to 15 percent by weight of dicyandiamide; from 0.1 to 10 percent photoinitiator; and up to 2 percent by weight of epoxy cure catalyst, based on the total weight of components a) through e).

Compositions according to the present invention comprise from 50, 55, 60, or 65 percent by weight up to 70, 75, 80, 85, or even 90 percent by weight of at least one epoxy resin preparable by reaction of epichlorohydrin with at least one of bisphenol A or bisphenol F, based on the total weight of components a) through e). Typically, such resins have an average epoxy functionality of two, although higher and lower functionalities may also be useful.

The epoxy resin may be liquid or solid. Whether liquid or solid, the epoxy resin may be chosen to be soluble in compositions according to the present invention. In some instances, heating compositions according to the present invention may facilitate dissolution of the epoxy resin.

Examples of useful epoxy resins include the epoxy resins formed by reaction of bisphenol A or bisphenol F with epichlorohydrin, and mixtures of such resins. Examples of bisphenol A-epichlorohydrin derived epoxy resins, bisphenol A diglycidyl ether (commonly referred to in the art as DGEBA) and bisphenol F diglycidyl ether and commercially available epoxy resins having the trade designation "EPON" (e.g., "EPON RESIN 825", "EPON RESIN 828", "EPON RESIN 1001F", "EPON RESIN 1002F", "EPON RESIN 1004F", "EPON RESIN 1009F", and "EPON RESIN 2003"), marketed by Resolution Performance Products, Houston, Tex. and many epoxy resins having the trade designation "D.E.R." (e.g., "D.E.R. 331", "D.E.R. 332", "D.E.R. 351", "D.E.R. 352", "D.E.R. 354", and "D.E.R. 356"), marketed by Dow Chemical Company, Midland, Mich.

Compositions according to the present invention comprise from 1, 5, or 10 percent by weight up to 12, 15, 18, or even 20 percent by weight of polyfunctional (meth)acrylate, based on the total weight of components a) through e). The polyfunctional (meth)acrylate has an acrylate functionality of at least two, for example, at least 3, 4, or even 5, and may be a blend of different (meth)acrylate monomers, (meth) acrylate oligomers, and/or (meth)acrylated polymers.

A wide variety of (meth)acrylate monomers, (meth) acrylate oligomers, and (meth)acrylated polymers are readily commercially available, for example, from such vendors as Sartomer Company, Exton, Pa., and UCB Radcure, Smyrna, Ga. Exemplary acrylate monomers include ethylene glycol di(meth)acrylate, hexanediol di(meth)acrylate, triethylene glycol di(meth)acrylate, trimethylolpropane tri(meth)acrylate, glycerol tri(meth)acrylate, pentaerythritol tri(meth)acrylate, ethoxylated trimethylolpropane tri(meth)acrylate, neopentyl glycol di(meth) acrylate, pentaerythritol tetra(meth)acrylate, dipentaerythritol penta(meth)acrylate, sorbitol tri(meth)acrylate, sorbitol hexa(meth)acrylate, Bisphenol A di(meth)acrylate, ethoxylated Bisphenol A di(meth)acrylates, and mixtures thereof.

Exemplary useful acrylate oligomers include acrylated epoxy oligomers (e.g., Bisphenol-A based epoxy acrylate oligomers such as, for example, those marketed under the trade designations "EBECRYL 3500", "EBECRYL 3600", "EBECRYL 3720", and "EBECRYL 3700" by UCB Radcure), aliphatic urethane acrylate oligomers (e.g., as marketed by UCB Radcure under the trade designation "EBECRYL 8402"), aromatic urethane acrylate oligomers, and acrylated polyesters (e.g., as marketed by UCB Radcure under the trade designation "EBECRYL 870"). Additional useful polyfunctional (meth)acrylate oligomers include polyether oligomers such as a polyethylene glycol 200 diacrylate, for example, as marketed by Sartomer Company under the trade designation "SR 259"; and polyethylene glycol 400 diacrylate, for example, as marketed by Sartomer Company under the trade designation "SR 344".

Curable compositions according to the present invention comprise an effective amount of dicyandiamide for curing the composition. For example, the curable composition may comprise from 1, 2, or 5 percent up to 10, 15 or even 20 percent by weight of dicyandiamide, based on the total weight of components a) through e). Dicyandiamide is widely available commercially, for example, as marketed by Air Products and Chemicals, Allentown, Pa. under the trade designations "AMICURE CG-1200" and "AMICURE CG-1400".

Compositions according to the present invention comprise an effective amount of photoinitiator for curing the composition. For example, the curable composition may comprise from 0.1, 1, or 3 percent by weight, up to 5, 7, or even 10 percent or more by weight of photoinitiator, based on the total weight of components a) through e).

Photoinitiator may be a single photoinitiator or a combination of two or more photoinitiators. Photoinitiators useful in the practice of invention include those known as useful for photocuring free-radically polyfunctional (meth)acrylates. Exemplary photoinitiators include benzoin and its derivatives such as α-methylbenzoin; α-phenylbenzoin; α-allylbenzoin; α-benzylbenzoin; benzoin ethers such as benzil dimethyl ketal (available, for example, under the trade designation "IRGACURE 651" from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available, for example, under the trade designation "DAROCUR 1173" from Ciba Specialty Chemicals) and 1-hydroxycyclohexyl phenyl ketone (available, for example, under the trade designation "IRGACURE 184" from Ciba Specialty Chemicals); 2-methyl-1-[4(methylthio)phenyl]-2-(4-morpholinyl)-1-propanone (available, for example, under the trade designation "IRGACURE 907" from Ciba Specialty Chemicals); 2-benzyl-2-(dimethlamino)-1-[4-(4-morpholinyl)phenyl]-1-butanone (available, for example, under the trade designation "IRGACURE 369" from Ciba Specialty Chemicals).

Other useful photoinitiators include pivaloin ethyl ether, anisoin ethyl ether; anthraquinones, such as anthraquinone, 2-ethylantrraquinone, 1-chloroanthraquinone, 1,4-dimethylanthraquinone, 1-methoxyanthraquinone, benzanthraquinonehalomethyltriazines, and the like; benzophenone and its derivatives; iodonium salts and sulfonium salts as described hereinabove; titanium complexes such as bis($\eta_5$-2,4-cyclopentadien-1-yl)bis[2,6-difluoro-3-(1H-pyrrol-1-yl)phenyl]titanium (obtained under the trade designation "CGI 784 DC", also from Ciba Specialty Chemicals); halomethylnitrobenzenes such as 4-bromomethylnitrobenzene and the like; mono- and bis-acylphosphines (available, for example, from Ciba Specialty Chemicals under the trade designations "IRGACURE 1700", "IRGACURE 1800", "IRGACURE 1850", and "DAROCUR 4265").

In some instances, it may be useful to include epoxy cure catalyst in compositions according to the present invention. Epoxy cure catalysts are well known and include imidazoles such as, for example, 2-ethylimidazole, and 2-ethyl-4-methylimidazole (e.g., as marketed under the trade designation "IMICURE EMI-2,4" by Air Products and Chemicals, Allentown, Pa., and 2-propylimidazole (e.g., as marketed under the trade designation "ACTIRON NXJ-60" by Synthron, Morganton, N.C.); and Lewis acid complexes such as boron trifluoride and boron trichloride complexes including, for example, $BF_3$.diethylamine and a $BCl_3$.amine complex marketed under the trade designation "OMICURE BC-120" by CVC Specialty Chemicals, Maple Shade, N.J.

Other known epoxy cure catalysts include aliphatic and aromatic tertiary amines including, for example, dimethylpropylamine, pyridine, dimethylaminopyridine, and dimethylbenzylamine.

If included, the amount of epoxy cure catalyst typically is typically in an amount of from 0.5 to 2 percent by weight, based on the total weight of components a) through e), although higher and lower amounts may also be useful.

Compositions according to the present invention may optionally include one or more epoxidized toughening agents. If included such epoxidized toughening agents may be in amounts up to 10, 20, or even 30 percent or even higher. Useful epoxidized toughening agents include, for example, epoxidized rubber (e.g., as marketed under the trade designation "HYPOX RA1340" by CVC Specialty Chemicals), urethane rubber modified epoxy resins (e.g., as marketed under the trade designation "PACIFIC 6246 FLEXIBLE EPOXY RESIN" or "PACIFIC 6246 FLEXIBLE EPOXY RESIN HV" by Pacific Epoxy Polymers, Richmond, Mo.); and epoxidized polybutadienes (e.g., as marketed under the trade designation "OXIRON 2001" by FMC Corporation, Philadelphia, Pa., or under the trade designations "POLY BD 600E" and "POLY BD 605E" by Atofina Chemicals, Philadelphia, Pa.).

Compositions according to the present invention may, optionally, include up to 5, 10, 15, 20, or even 25 percent by weight or more of one or more novolac phenolic resins, based on the total weight of the curable composition.

Typically, novolac resins are made by reacting a phenolic monomer (e.g., phenol, cresol, xylenol, resorcinol, catechol, bisphenol A, naphthol, or a combination thereof) with an aldehyde in the presence of an acid catalyst, with the molar ratio of the aldehyde to phenol being less than one. Examples of aldehydes used to prepare novolacs include formaldehyde, acetaldehyde, propionaldehyde, glyoxal, and furfural. Typically, these, novolac resins have a molecular weight ranging from 300 to 1,500, although higher and lower molecular weights may also be useful. Additionally, the starting phenolic monomer can be substituted with various groups such as alkyl, alkoxy, carboxyl, and sulfo, as long as there are at least two reactive sites remaining to form the novolac.

Many novolac phenolic resins are readily available from commercial suppliers including, for example, Georgia Pacific Resins, Atlanta, Ga. (e.g., as marketed under the trade designations "GP 2074", "GP 5300", "GP 5833", "RESI-FLAKE GP-2049", "RESI-FLAKE GP-2050", or "RESI-FLAKE GP-2211"); Bakelite AG, Frielendorf, Germany (e.g. as marketed under the trade designation "RUTAPHEN 8656F"); Borden Chemical, Inc (e.g. as marketed under the trade designations "DURITE 423 A" or "DURITE SD1731"). While novolac resins are typically useful, resole phenolic resins may tend to interfere with curing of curable compositions according to the present invention, and if included should be used with discretion.

Curable compositions according to the present invention may further comprise an optional bireactive polymerizable component, for example, a compound having at least one free-radically polymerizable group, and at least one cationically polymerizable group. Bireactive compounds can be made, for example, by introducing at least one ethylenically unsaturated group into a compound that already contains one or more epoxy groups, or, conversely, by introducing at least one epoxy group into a compound that already contains one or more ethylenically unsaturated group.

Curable compositions according to the present invention may contain a variety of additives such as, for example, fillers, thickeners, tougheners, grinding aids, pigments, fibers, tackifiers, lubricants, wetting agents, surfactants, anti-foaming agents, dyes, coupling agents, plasticizers, and suspending agents.

Advantageously, in some embodiments curable compositions according to the present invention can be formulated with low viscosity (e.g., less than 250 milliPascal-seconds). Low viscosity is useful for many common coating techniques; however, in some cases it may lead to undesired diffusion of the coating into the interior of the backing (e.g., a presize) during cure. In such cases, the curable composition may be thickened after coating by exposure to actinic radiation, prior to exposure to thermal energy.

In applications in which low viscosity is desirable, such as, for example, as a backing treatment, curable compositions according to the present invention may be essentially free of dissolved thermoplastic polymers (e.g., thermoplastic polymers having a weight average molecular weight of 5,000 or more), as such materials tend to greatly increase viscosity, which may make coating processes difficult (e.g., saturating a porous backing).

Curable compositions according to the present invention may be applied to a variety of substrates using conventional methods such as, for example, roll coating (e.g., using soft rubber rolls), spraying, transfer coating, dip coating, screen printing, gravure coating, curtain coating, bar coating, knife coating, or die coating. Curable compositions may be applied to a substrate in a uniform or patterned manner, and may be continuous or discontinuous.

If utilizing curable compositions comprising solid components, such compositions may be prepared, for example, by mixing some or all of the various materials of the curable composition in a suitable vessel at an elevated temperature, for example, less than 100° C., sufficient to liquify at least some of the materials so that they may be efficiently mixed, with stirring, to form the curable composition, but without thermally degrading the components.

Curable compositions may be cured by exposure to thermal energy, actinic radiation, or more typically a combination thereof. In such cases, curing of the curable composition typically begins upon exposing it to an appropriate source of actinic radiation (e.g., ultraviolet, visible, or particulate radiation), and may continue for a period thereafter.

Useful forms of thermal energy include, for example, heat and infrared radiation. Exemplary sources of thermal energy include ovens, heated rolls, hot air blowers, infrared lamps, and combinations thereof.

The choice of the source of actinic radiation is typically selected depending on the intended processing conditions, and to appropriately activate the photoinitiator. Exemplary useful sources of ultraviolet and visible radiation include mercury, xenon, carbon arc, tungsten filament lamps, and sunlight. Ultraviolet radiation, especially from a medium pressure mercury arc lamp or a microwave driven H-type, D-type, or V-type mercury lamp, such as of those commercially available from Fusion UV Systems, Gaithersburg, Md., is especially desirable.

Exposure times for the actinic radiation typically range, for example, from less than about 0.01 second to 1 minute or longer providing, for example, a total energy exposure from 0.1 to 10 Joules per square centimeter ($J/cm^2$) depending upon the amount and the type of reactive components involved, the energy source, web speed, the distance from the energy source, and the thickness of the make layer to be cured. Filters and/or dichroic reflectors may also be useful, for example, to reduce thermal energy that accompanies the actinic radiation.

If electron beam radiation is used, the dosage necessary is generally from less than 1 megarad to 100 megarads or more.

In one aspect, curable compositions according to the present invention may be applied to fabric, for example, for use as a treated backing in the manufacture of coated abrasive articles. Such treated backings are typically prepared by applying a curable composition according to the present invention to at least a portion of a fabric and at least partially curing the curable composition. For example, if the fabric has opposed two major surfaces, the curable composition may be applied in such a manner as to contact only one of the major surfaces or in such a manner as to contact both major surfaces (e.g., by saturating the fabric with curable composition or both applying a curable composition to each major surface of the fabric).

Useful fabrics include, for example, nonwoven (e.g., including needletacked, meltspun, spunbonded, hydroentangled, or meltblown nonwoven fabrics), knitted, stitchbonded, and woven fabrics (e.g., cloth).

Useful fabrics can be made from any known fibers, whether natural, synthetic or a blend of natural and synthetic fibers. Examples of useful fiber materials include fibers or yarns comprising polyester (e.g., polyethylene terephthalate), polyamide (e.g., hexamethylene adipamide, polycaprolactam), polypropylene, acrylic (formed from a polymer of acrylonitrile), cellulose acetate, polyvinylidene chloride-vinyl chloride copolymers, vinyl chloride-acrylonitrile copolymers, graphite, polyimide, silk, cotton, linen, jute, hemp, or rayon. Treated backings according to the present invention may be rigid or flexible. The fabric may have any thickness, depending on the intended use. The quantity of curable composition applied to the fabric may be any amount, again depending upon the specific application.

Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (e.g., a co-spun sheath-core fiber). The fibers may be tensilized and crimped, but may also be continuous filaments such as those formed by an extrusion process.

Curable compositions and treated backings according to the present invention are also useful in the manufacture of coated abrasive articles, wherein they may provide good adhesion between the abrasive layer and the backing.

One such coated abrasive article is illustrated in FIG. 1. Referring now to FIG. 1, exemplary coated abrasive article 100 comprises backing 112. Backing 112 may optionally be saturated with saturant 111. Additionally, backing 112 may be treated with optional backsize layer 113 and/or optional presize layer 115. In the case that backing 112 is porous, backsize layer 113 and presize layer 115 penetrate into the backing, and may even contact each other within the porous interior of the backing in some cases. Overlaying presize layer 115 is abrasive layer 114 comprising make layer 116 in which are embedded abrasive grits 118 and size layer 117 which overlays make layer 116 and abrasive grits 118. Optional supersize layer 119 overlays size layer 117.

Figure 2:
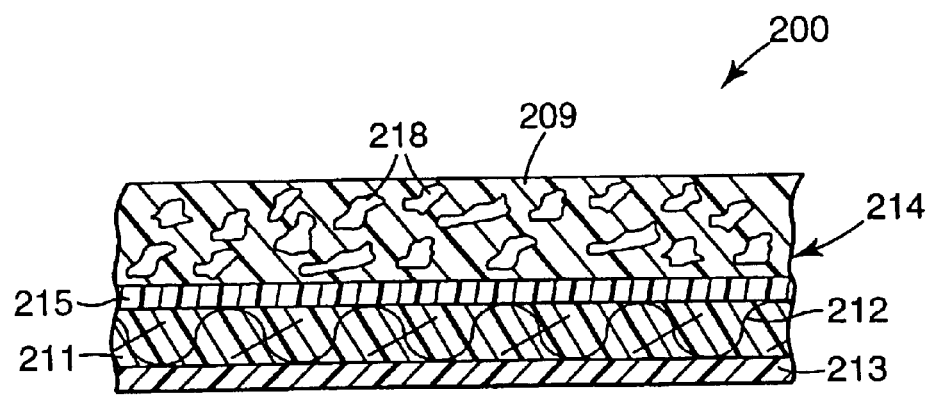
FIG. 2 is a cross-sectional side view of another exemplary coated abrasive article according to the present invention.

Another exemplary coated abrasive article according to the present invention FIG. 2. Referring now to FIG. 2, coated abrasive article 200 comprises backing 212. Backing 212 may optionally be saturated with saturant 211. Additionally, backing 212 may be treated with optional backsize layer 213 and/or optional presize layer 215. In the case that backing 212 is porous, backsize layer 213 and presize layer 215 penetrate into the backing, and may even contact each other within the porous interior of the backing in some cases. Overlaying presize layer 215 is abrasive layer 214, which includes a plurality of abrasive grits 218 distributed throughout binder 209.

Binders comprising a reaction product of curable compositions according to the present invention may be used, for example, as one or more of a saturant, subsize, presize layer, backsize layer. The purpose of these materials is typically to seal the backing, protect yarn or fibers in the backing, and/or promote adhesion of other layer(s) to the backing. If the backing is a fabric, at least one of these materials is typically used. The addition of the presize layer or backsize layer may additionally result in a "smoother" surface on either the front and/or the backside of the backing.

The good adhesion of binders comprising a reaction product of curable compositions according to the present invention to backings also make them suitable for use as a tie layer, or in an abrasive layer. For example, curable compositions according to the present invention may be applied onto a backing as a make coat or a slurry coat, and then at least partially cured at an appropriate point in the manufacturing process to form a make layer or a binder having abrasive particles distributed therein.

For use in coated abrasive articles, the thickness of the backing generally ranges from 0.02 to 5 millimeters, for example, from 0.05 to 2.5 millimeters, or from 0.1 to 1 millimeter, although thicknesses outside of these ranges may also be useful.

In addition to the fabrics used to make treated backings discussed above, useful backings for manufacture of coated abrasive articles include flexible backings such as polymeric film (including primed film) such as polyolefin film (e.g., polypropylene including biaxially oriented polypropylene, polyester film, polyamide film, cellulose ester film), metal foil, mesh, foam (e.g., natural sponge material or polyurethane foam), paper, coated paper, vulcanized paper, vulcanized fiber, and combinations thereof, and rigid backings such as, for example, metal plates or ceramic plates. Another example of a suitable rigid backing is described, for example, in U.S. Pat. No. 5,417,726 (Stout et al.), the disclosure of which is incorporated herein by reference.

The backing may also be a laminate of two materials (e.g., paper/film, cloth/paper, or film/cloth). The backing may also be a fibrous reinforced thermoplastic such as described, for example, as described, for example, in U.S. Pat. No. 5,417,726 (Stout et al.), or an endless spliceless belt, as described, for example, in U.S. Pat. No. 5,573,619 (Benedict et al.), the disclosures of which are incorporated herein by reference.

The backing may be a polymeric substrate having hooking stems projecting therefrom such as that described, for example, in U.S. Pat. No. 5,505,747 (Chesley et al.), or the backing may be a loop fabric such as that described, for example, in U.S. Pat. No. 5,565,011 (Follett et al.), the disclosures of which are incorporated herein by reference.

The choice of backing material may depend on the intended application of the coated abrasive article. The thickness and smoothness of the backing should also be suitable to provide the desired thickness and smoothness of the coated abrasive article, wherein such characteristics of the coated abrasive article may vary depending, for example, on the intended application or use of the coated abrasive article.

An antistatic material may be included in any of these backing treatment materials. The addition of an antistatic material can reduce the tendency of the coated abrasive article to accumulate static electricity when sanding wood or wood-like materials. Additional details regarding antistatic backings and backing treatments can be found in, for example, U.S. Pat. Nos. 5,108,463 (Buchanan et al.); 5,137,542 (Buchanan et al.); 5,328,716 (Buchanan); and 5,560,753 (Buchanan et al.), the disclosures of which are incorporated herein by reference.

In some instances, it may be desirable to incorporate a pressure-sensitive adhesive onto the backside of the coated abrasive article such that the resulting coated abrasive article can be secured to a back up pad. Exemplary pressure-sensitive adhesives include latex crepe, rosin, acrylic polymers, and copolymers including polyacrylate esters (e.g., poly(butyl acrylate)), vinyl ethers (e.g., poly(vinyl n-butyl ether)), alkyd adhesives, rubber adhesives (e.g., natural rubber, synthetic rubber, chlorinated rubber), and mixtures thereof.

To promote adhesion of binder resins to the backing, one or more surfaces of the backing may be modified by known methods including corona discharge, ultraviolet light exposure, electron beam exposure, flame discharge, and/or scuffing.

Details concerning coated abrasive articles comprising abrasive particles and make, size, and optional supersize layers are well known and are described, for example, in U.S. Pat. Nos. 4,734,104 (Broberg); 4,737,163 (Larkey); 5,203,884 (Buchanan et al.); 5,152,917 (Pieper et al.); 5,378,251 (Culler et al.); 5,417,726 (Stout et al.); 5,436,063 (Follett et al.); 5,496,386 (Broberg et al.); 5,609,706 (Benedict et al.); 5,520,711 (Helmin); 5,954,844 (Law et al.); 5,961,674 (Gagliardi et al.); 4,751,138 (Bange et al.); 5,766,277 (DeVoe et al.); 6,077,601 (DeVoe et al.); 6,228,133 (Thurber et al.); and 5,975,988 (Christianson), the disclosures of which are incorporated herein by reference.

The basis weight of the make layer utilized may depend, for example, on the intended use(s), type(s) of abrasive particles, and nature of the coated abrasive article being prepared, but generally will be in the range of from 1, 2, or 5 to 20, 25, 400, or even 600 grams per square meter (i.e., $g/m^2$). The make layer may be applied by any known coating method for applying a make layer to a backing, including, for example, roll coating, extrusion die coating, curtain coating, knife coating, gravure coating, and spray coating.

After applying the make layer to the backing, and prior to solidification of the make layer (e.g., by curing), abrasive particles are deposited onto the make layer.

Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Examples of sol-gel abrasive particles include those described U.S. Pat. Nos. 4,314,827 (Leitheiser et al.); 4,518,397 (Leitheiser et al.); 4,623,364 (Cottringer et al.); 4,744,802 (Schwabel); 4,770,671 (Monroe et al.); 4,881,951 (Wood et al.); 5,011,508 (Wald et al.); 5,090,968 (Pellow); 5,139,978 (Wood); 5,201,916 (Berg et al.); 5,227,104 (Bauer); 5,366,523 (Rowenhorst et al.); 5,429,647 (Larmie); 5,498,269 (Larmie); and 5,551,963 (Larmie), the disclosures of which are incorporated herein by reference. The abrasive particles may be in the form of, for example, individual particles, agglomerates, abrasive composite particles, and mixtures thereof.

Exemplary agglomerates are described, for example, in U.S. Pat. Nos. 4,652,275 (Bloecher et al.) and 4,799,939 (Bloecher et al.), the disclosures of which are incorporated herein by reference. It is also within the scope of the present invention to use diluent erodible agglomerate grains as described, for example, in U.S. Pat. No. 5,078,753 (Broberg et al.), the disclosure of which is incorporated herein by reference. Abrasive composite particles comprise abrasive grains in a binder.

Exemplary abrasive composite particles are described, for example, in U.S. Pat. No. 5,549,962 (Holmes et al.), the disclosure of which is incorporated herein by reference.

Coating weights for the abrasive particles may depend, for example, on the specific coated abrasive article desired, the process for applying the abrasive particles, and the size of the abrasive particles, but typically range from 1 to 2000 $g/m^2$.

The basis weight of the size layer will also necessarily vary depending on the intended use(s), type(s) of abrasive particles, and nature of the coated abrasive article being prepared, but generally will be in the range of from 1 or 5 $g/m^2$ to 300, or even 800 $g/m^2$, or more. The size layer may be applied by any known coating method for applying a size layer to a backing including, for example, roll coating, extrusion die coating, curtain coating, and spray coating.

In some embodiments of coated abrasive articles according to the present invention, the abrasive layer comprises a dispersion of abrasive particles and binder that is the reaction product of a curable composition according to the present invention (typically coated as a slurry). Slurry coating techniques are well known in the abrasive art, and include those described, for example, in U.S. Pat. Nos. 5,378,251 (Culler et al.); 5,942,015 (Culler et al.); and 6,277,160 (Stubbs et al.); the disclosures of which are incorporated herein by reference.

Coated abrasive articles according to the present invention can be converted, for example, into belts, tapes, rolls, discs (including perforated discs), and/or sheets. For belt applications, two free ends of the abrasive sheet may be joined together using known methods to form a spliced belt. A spliceless belt may also be formed as described, for example, in U.S. Pat. No. 5,573,619 (Benedict et al.), the disclosure of which is incorporated herein by reference.

Coated abrasive articles according to the present invention are useful for abrading a workpiece. One such method includes frictionally contacting at least a portion of the abrasive layer of a coated abrasive article with at least a portion of a surface of the workpiece, and moving at least one of the coated abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades.

Coated abrasive articles according to the present invention may be used by hand and/or used in combination with a machine. At least one or both of the coated abrasive article and the workpiece is generally moved relative to the other when abrading.

Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, and/or the like.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, and ratios reported in the following examples are on a weight basis, and all reagents used in the examples were obtained, or are available, from general chemical suppliers such as the Sigma-Aldrich Chemical Company, Saint Louis, Mo., or may be synthesized by conventional techniques.

The following abbreviations are used in the following Examples:

"ACR1": trimethylolpropane triacrylate, obtained under the trade designation "TMPTA-N" from UCB Radcure;

"ACR2": acrylated difunctional epoxy resin, obtained under the trade designation "EBECRYL 3720" from UCB Radcure;

"ACR3": acrylated difunctional polyester, obtained under the trade designation "EBECRYL 870" from UCB Radcure;

"ACR4": acrylated aliphatic urethane, obtained under the trade designation "EBECRYL 8402" from UCB Radcure;

"ADHCUR1": modified aliphatic amine, obtained under the trade designation "ANCAMNE AD CURING AGENT" from Air Products and Chemicals;

"ADHCUR2": cycloaliphatic diamine obtained under the trade designation "PACM" from Air Products and Chemicals;

"ALO": ANSI grade 36 aluminum oxide abrasive mineral, obtained under the trade designation "DURALUM G52 BROWN ALUMINUM OXIDE GRADE 36" from Washington Mills Electro Minerals Corporation, Niagara Falls, N.Y.;

"AZ": ANSI grade 50 aluminum oxide/zirconium oxide eutectic blend, obtained under the trade designation "NORZON" from Saint-Gobain Abrasives, Worcester, Mass.;

"CTBN": an acrylonitrile butadiene copolymer ($M_n$= 3500, 18 percent acrylonitrile), obtained under the trade designation "polyacrylonitrile-co-butadiene dicarboxy terminated" from Aldrich Chemical Company, Milwaukee, Wis.;

"CUR1": 2-propylimidazole, obtained under the trade designation "ACTIRON NXJ-60 LIQUID" from Synthron, Morganton, N.C.;

"CUR2": dimethylbenzylamine, obtained under the trade designation "DESMORAPID" from Bayer Corporation, Pittsburgh, Pa.;

"DICY": dicyandiamide (having an average particle size of less than 10 micrometers), obtained under the trade designation "AMICURE CG-1400" from Air Products and Chemicals;

"EMI": 2-ethyl-4-methylimidazole, obtained under the trade designation "IMICURE 2,4 EMI" from Air Products and Chemicals;

"EP1": bisphenol A epoxy functional material, obtained under the trade designation "EPON 828" from Resolution Performance Products, Houston, Tex.;

"ETA1": epoxidized rubber, obtained available under the trade designation "HYPOX RA1340" from CVC Specialty Chemicals;

"ETA2": epoxidized polyurethane, obtained under the trade designation "PACIFIC 6246 FLEXIBLE EPOXY RESIN" from Pacific Epoxy Polymers, Richmond, Mo.;

"FIL1": calcium carbonate, obtained under the trade designation "Q325" from J.M. Huber Corporation, Atlanta, Ga.

"FIL2": cryolite, obtained under the trade designation "RTN CRYOLITE" from TR International Trading Company, Houston, Tex.;

"HHPA": hexahydrophthalic anhydride, obtained from Buffalo Color Corporation, Buffalo, N.Y.;

"HMA": a polyamide hot melt adhesive obtained under the trade designation "JET MELT BRAND ADHESIVE PG3779" from 3M Company, Saint Paul, Minn.;

"NOV1": novolac resin, obtained under the trade designation "RUTAPHEN 8656F" from Bakelite AG, Frielendorf, Germany;

"PI1": 2,2-dimethoxy-2-phenylacetophenone, obtained under trade designation "IRGACURE 651" from Ciba Specialty Chemicals, Hawthorne, N.Y.; and "RIO": red iron oxide pigment, obtained under the trade designation "KROMA RO-3097" from Elementis, East Saint Louis, Ill.

The following test methods were used in the following Examples.

Swing Arm Test

The abrasive disc to be evaluated was attached to a 20.3 cm circular backup plate, commercially available as Part No. 05114145192 from 3M Company. The backup plate was then secured to a testing device obtained under the trade designation "SWING ARM TESTER" from Reel Manufacturing, Centerville, Minn., using a metal screw fastener. A 1.897 mm thick 4130 steel (alloy steel containing by weight C 0.28–0.33 percent, Si 0.20–0.35 percent, Mn 0.40–60 percent, Cr 0.80–1.10 percent, P 0.025 percent maximum, Mo 0.15–0.25 percent, S 0.025 percent maximum) cylindrical shaped work piece with a 30.5 cm diameter and 1.897 mm thickness was weighed and secured to the testing device with a metal fastener. During each test, the steel workpiece was applied to the abrasive article disc with a force of 39.2 Newtons. The abrasive article disc was rotated at 3500 revolutions per minute (rpm), and the workpiece was placed against the disc at an angle of 7 degrees for 2 minutes, while the workpiece was rotated at 2 rpm. The amount of steel removed (total cut) and weight loss of each abrasive disc (i.e., shelling) was recorded.

Stripback Test

A 17.8 cm×7.6 cm×6 mm thick wooden board was coated with a laminating composition selected from Conventional Laminating Adhesive 1 and Conventional Laminating Adhesive 2.

If Conventional Laminating Adhesive 1 was used, it was dispensed using a hot melt adhesive glue gun. A 15 cm section of a 25 cm×8 cm strip of the coated abrasive to be tested was partially overlaid onto the molten laminating composition with the abrasive side facing the laminating composition. The abrasive strip was then pressed into position and then the assembly was cooled to 25° C.

If Conventional Laminating Adhesive 2 was used, a 15 cm section of a 25 cm×8 cm strip of the coated abrasive to be tested, with the abrasive side also coated with the laminating adhesive (in addition to the board), was partially overlaid onto the laminating adhesive with the abrasive side facing the board. The abrasive strip was pressed into position, and then cured at 100° C. for 60 minutes, 120° C. for 20 minutes, 130° C. for 15 minutes, then finally at 140° C. for 15 minutes.

The coated abrasive was then converted to 5.1 cm width, thereby providing a 10 cm×5.1 cm strip of coated abrasive material extending beyond the wooden board.

The wooden board was mounted horizontally into the upper jaws of a tensile testing machine, obtained under the trade designation "SINTECH 6W" from MTS Systems Corporation, Eden Prairie, Minn. The free end of the coated abrasive was then attached to the lower jaws of the tensile tester and, at a rate of 0.5 mm/second, the lower jaws pulled the coated abrasive from the wooden board at an angle of 90 degrees. The force, expressed in Newtons per centimeter (N/cm) of sample width, necessary to cause failure of the test specimen was reported. The test was run at the indicated temperature.

Example 1

EP1 (12060 g) was mixed with 1507 g of ACR1 and 151 g of PI1 at 20° C. until homogeneous using a mechanical stirrer. The mixture was then heated at 50° C. in an oven for 2 hours. After removing the mixture from the oven, 1206 g of DICY was added and with stirring over 10 minutes. EMI (76 grams) was then added and stirring continued until dissolved, resulting in Composition 1.

Example 2

The procedure of Example 1 was repeated, except that the amount of EP1 was decreased to 11306 grams, 754 grams NOV1 was added to the mixture after addition of the DICY, and the EMI was replaced by 114 grams CUR1, resulting in Composition 2.

Example 3

The procedure of Example 2 was repeated, except that the quantity of EP1 was decreased to 10553 g, NOV1 was replaced with 1507 g of ETA2, and CUR1 was replaced with 76 g EMI, resulting in Composition 3.

Example 4

The procedure of Example 3 was repeated, except that the quantity of EP1 was decreased to 9799 g, the quantity of ACR1 was increased to 2261 g, and the ETA2 was replaced with an equal weight of NOV1, resulting in Composition 4.

Example 5

The procedure of Example 4 was repeated, except using the following amounts of components: 55 g of EP1, 15 g of ACR1, 8 g of DICY, 10 g of NOV1, 10 g of ETA2, 1 g of EMI, and 1 g of PI1, resulting in Composition 5.

Example 6

The procedure of Example 5 was repeated, except that the EMI was replaced with 1 g of CUR2, resulting in Composition 6.

Example 7

The procedure of Example 6 was repeated, except that the CUR2 was replaced with 1 g of CUR1, resulting in Composition 7.

Example 8

The procedure of Example 1 was repeated, except that the following amounts of ingredients were used: 18.75 g of EP1, 3.75 g of ACR4, 2 g of DICY, 0.25 g of EMI, 0.25 g of PI1, resulting in Composition 8.

Example 9

The procedure of Example 8 was repeated, except that 2.5 g of the EP1 was replaced with 2.5 g of ETA1 and the ACR4 was replaced with 3.75 g of ACR2, resulting in Composition 9.

Example 10

The procedure of Example 9 was repeated, except that ACR2 was replaced with 3.75 g of ACR3, resulting in Composition 10.

Comparative Example A

The procedure of Example 4 was repeated, except that the DICY was omitted and the following amounts of components were used: 70 g of EP1, 15 g of ACR1, 10 g of NOV1, 0.5 g EMI, and 1 g of PI1, resulting Comparative Composition A.

Comparative Example B

The procedure of Example 10 was repeated, except that ACR3 was replaced with 3.75 g of ACR1, and the ETA1 was replaced by 2.8 grams of CTBN, resulting Comparative Composition B.

Conventional Backsize Composition

FIL1 (450 g) and 15 g of RIO were mechanically stirred into 285 g of a phenol-formaldehyde resin having a phenol to formaldehyde ratio of 1.5–2.1/1, catalyzed with 2.5 percent by weight sodium hydroxide. The mixture was then diluted to 1 kilogram with water.

Comparative Example C

A 237 ml jar was charged with 70 grams EP1, 30 grams HHPA, and 1 gram of PI1. The jar containing the composition was placed in an oven heated to 50° C. for 15 minutes, removed from the oven and 5.4 grams of ACR1 was mixed into the composition and returned to the oven for another 15 minutes. The resin composition was removed from the oven and 1 gram EMI was added with mixing.

A 30.5 cm wide coating knife obtained from Paul N. Gardner Company, Pompano Beach, Fla., and a 30 cm×30 cm×2.5 cm machined stainless steel coating platform were heated to 66° C. The knife was set to a minimum gap of 225 micrometers. Untreated polyester cloth having a weight of 300–400 grams per square meter (g/m$^2$), obtained under the trade designation "POWERSTRAIT" from Milliken & Company, Spartanburg, S.C., was placed under the coating knife. The resin composition was poured onto the polyester cloth and then the cloth was pulled by hand under the knife to form a presize coat on the cloth. The pre-sized cloth was then irradiated by passing once through a UV processor obtained under the trade designation "UV PROCESSOR", obtained from Fusion UV Systems, Gaithersburg, Md., using a "FUSION D" bulb at 761 Watts/inch$^2$ (118 W/cm$^2$) and 16.4 feet/minute (5 m/min), then thermally cured at 160° C. for 5 minutes. The resultant pre-size coating weight was 106 g/m$^2$. The backside of the cloth was then coated with the Conventional Backsize Composition using the same knife coating procedure and cured at 90° C. for 60 minutes, then at 105° C. for 60 minutes. The resultant backsize coating weight after curing was 104.3 g/m$^2$.

Comparative Example D

A backing material (100 percent polyester 4/1 sateen fabric made from open end spun yarns weighing about 300–400 grams per square meter) obtained under the trade designation "POWERSTRAIT" from Milliken and Company, was treated with a saturant of 90 percent by weight resole phenolic used in the Conventional Backsize Composition/10 percent by weight nitrile latex resin, available from Noveon, Cleveland, Ohio, under the trade designation "HYCAR 1581", bringing the weight to 416 grams per square meter and was subsequently backsized with a blend of 55 percent F1; 43 percent resole phenolic used in the Conventional Backsize Composition; and a small amount of Fe$_2$O$_3$ for color, bringing the weight to about 516 grams per square meter. This backing was then coated with the same make coat composition and under the same conditions as in Comparative Example C.

Example 11

Composition 1 was applied as a pre-size onto a six inch (16.2 cm) web of woven polyester cloth (300400 g/m$^2$) basis weight, obtained under the trade designation "POWERSTRAIT" from Milliken and Company, using a 4 inch (10.2 cm) wide coating knife, obtained from Paul N. Gardner Company, having a blade gap of 0.003 inch (76 micrometers). The pre-sized cloth was then irradiated by passing once through the UV processor described above, using a "FUSION D" bulb at 761 Watts/inch$^2$ (118 W/cm$^2$) and 16.4 feet/minute (5 m/min), then thermally cured at 160–170° C. for 5 minutes. The resultant pre-size coating weight was found to be 127.5 g/m$^2$. The backside of the cloth was then coated with the Conventional Backsize Composition using the same knife coating procedure and cured at 90° C. for 10 minutes, then at 105° C. for 15 minutes. The resultant backsize coating weight after curing was 111.5 g/m$^2$.

Examples 12–17 and Comparative Examples E–F

Examples 12–17, and Comparative Examples E and F were made according to the procedure of Example 11 using the compositions reported in Table 1 (below).

TABLE 1

| Backing Example | Pre-Size | Pre-Size Coating Weight, g/m$^2$ | Backsize Coating Weight, g/m$^2$ |
|---|---|---|---|
| 12 | Composition 2 | 127.5 | 111.5 |
| 13 | Composition 3 | 133.0 | 93.5 |
| 14 | Composition 4 | 127.5 | 134.0 |
| 15 | Composition 5 | 121.5 | 98.0 |
| 16 | Composition 6 | 76 micrometers wet thickness film | None |
| 17 | Composition 7 | 76 micrometers wet thickness film | None |
| Comparative E | Comparative Composition A | 76 micrometers wet thickness film | 76 micrometers wet thickness film |
| Comparative F | Comparative Composition B | 76 micrometers wet thickness film | 76 micrometers wet thickness film |

Example 18

A 2-inch (5.1 cm) wide, 0.014 inch (360 micrometers) thick web of polyester film obtained under the trade designation "TYPE A MYLAR" from Belting Industries Company, Kenilworth, N.J., was coated with Composition 8 and then UV cured according to the procedure of Example 11. The knife gap was 0.010 inch (250 micrometers).

Examples 19 and 20

Examples 19 and 20 were made according to the procedure of Example 18 using Compositions 9 and 10, respectively.

Comparative Example G

A 237 ml jar was charged with 70 g of EP1, 30 g of HHPA, and 1 g of PI1 and placed in an oven at 50° C. for 15 minutes. The jar was removed from the oven and 5.4 g of ACR1 was added and manually stirred before returning to the oven for another 15 minutes. The jar was then again removed from the oven and 1 g of EMI was added. The mixture was stirred and immediately coated as described in Example 18.

The adhesion was measured by bending the coated film by hand at an approximately 60 degree angle and observing whether the coating cleanly delaminated from the polyester film (indicative of poor adhesion to polyester film) or if coating upon delamination from polyester film retained some polyester (indication of good adhesion to polyester film). Comparative Example G and Examples 18, 19, and 20 retained some polyester during the test, therefore indicating good adhesion to the polyester film.

Conventional Laminating Adhesive 1

HMA was used as the laminating composition.

Conventional Laminating Adhesive 2

A 237 ml jar was charged with 100 g of EP1, 28 g of ADHCUR2, 5 g of ADHCUR1, and 80 g of FIL1, and then mixed with a low shear mixer until homogeneous.

Examples 21–24

A 237 ml glass jar was charged with EP1, ACR1, and PI1. The mixture was placed in an oven and placed in an oven at 50° C. for 2 hours. The sample was removed from the oven and mixed using an overhead stirrer. NOV1 and DICY were added and stirring was continued for 10 minutes. FIL1 was added to the mixture, which was stirred for another 15 minutes. Then, EMI was added to the mixture with stirring.

In Examples 21–24 the above procedure was used to prepare Compositions 21–24, respectively using the amounts reported in Table 2 (below).

TABLE 2

| Composition | EP1 | ACR1 | DICY | NOV1 | ETA2 | EMI | CUR1 | FIL1 |
|---|---|---|---|---|---|---|---|---|
| 21 | 75 | 3 | 8 | 5 | 0 | 0 | 1 | 86 |
| 22 | 70 | 3 | 8 | 0 | 10 | 1 | 0 | 79 |
| 23 | 80 | 3 | 8 | 0 | 0 | 1 | 0 | 86 |
| 24 | 80 | 3 | 8 | 0 | 0 | 1 | 0 | 0 |

Conventional Make Coat Composition

FIL1 (425 g) was added to 425 grams of a phenol-formaldehyde resin, having phenol to formaldehyde ratio of 1.5–2.1/1, catalyzed with 2.5 percent potassium hydroxide. The mixture was then diluted with water to one kilogram total weight.

Conventional Size Coat Composition

FIL2 (561 g) and 17 g of RIO was mechanically mixed into 272 grams of a phenol-formaldehyde resin having a phenol to formaldehyde weight ratio of 1.5–2.1/1, and catalyzed with 2.5 percent potassium hydroxide. The mixture was then diluted to 1 kilogram with water.

Examples 25–31

The conventional make coat composition, prepared above, was applied to various backings as shown in Table 3 at a 76 micrometer wet thickness and 20° C. using a 4-inch (10 cm) wide coating knife, described above, having a blade gap of 0.003 inch (8 micrometers). ALO was drop coated onto the make coat at a coverage of 1000 g/m$^2$, and the resultant product was then cured at 90° C. for 60 minutes, then at 105° C. for 10 hours more. After cooling, each resultant coated abrasive was converted into 8 cm×25 cm strips for evaluation by the Stripback test. Results are reported in Table 3 (below).

TABLE 3

| Example | Treated Backing | Conventional Laminating Adhesive | Stripback Test at 25° C., N/cm | Stripback Test at 121° C., N/cm |
|---|---|---|---|---|
| Comparative Example H | Comparative Example C | 2 | 63.7 | 20.6 |
| Comparative Example I | Comparative Example D | 2 | 52.9 | 38.2 |
| Comparative Example J | Comparative Example E | 2 | 58.8 | 13.7 |
| Comparative Example K | Comparative Example F | 1 | 3.92 | NM |
| 25 | Example 11 | 2 | 66.6 | 40.2 |
| 26 | Example 12 | 2 | 69.6 | 47.0 |
| 27 | Example 13 | 2 | 66.6 | 40.2 |
| 28 | Example 14 | 2 | 52.9 | 30.4 |
| 29 | Example 15 | 2 | 58.8 | 40.2 |
| 30 | Example 16 | 1 | 66.6 | NM |
| 31 | Example 17 | 1 | 52.9 | NM |

In Table 3, the phrase "NM" means not measured.

Examples 32–35 and Comparative Example L

Using a paint brush, Examples 21–24 and the conventional make coat composition were coated onto 17.8 cm diameter, 0.76 mm thick, nylon discs, obtained under trade designation "ULTRAMID" from BASF Corporation, Mount Olive, N.Y. Examples 21–24 were then irradiated by passing once through the "UV PROCESSOR" described above, using a "FUSION D" bulb at 761 Watts/inch$^2$ (118 W/cm$^2$) and 16.4 feet/minute (5 m/min), then AZ was electrostatically coated onto the make resin and the resultant article was thermally cured at 160–170° C. for 30 minutes, resulting in Examples 32–35, respectively.

As a comparative (Comparative Example L), the conventional make composition was electrostatically coated with AZ and cured for 60 minutes at 90° C. and 60 minutes at 105° C. The conventional size coat composition was applied by a roller to all coated discs and cured at 90° C. for 60 minutes and at 105° C. for 12 hours. Coating weights of the examples, prepared in duplicate, are reported in Table 4 (below).

TABLE 4

| Example | Make Coat Composition | Coat Weight of Make Coat, g/m$^2$ | Coat Weight of Mineral, g/m$^2$ | Coat Weight of Size Coat, g/m$^2$ |
|---|---|---|---|---|
| Comparative Example L-1 | Conventional | 114.2 | 632.2 | 363.0 |
| Comparative Example L-2 | Conventional | 130.5 | 652.6 | 353.2 |
| 32-1 | 21 | 212.1 | 595.5 | 237.0 |
| 32-2 | 21 | 183.6 | 546.6 | 215.0 |
| 33-1 | 22 | 142.8 | 571.1 | 292.1 |
| 33-2 | 22 | 163.2 | 571.1 | 300.6 |

TABLE 4-continued

| Example | Make Coat Composition | Coat Weight of Make Coat, g/m² | Coat Weight of Mineral, g/m² | Coat Weight of Size Coat, g/m² |
|---|---|---|---|---|
| 34-1 | 23 | 142.8 | 615.9 | 381.8 |
| 34-2 | 23 | 167.2 | 607.8 | 366.7 |
| 35-1 | 24 | 146.8 | 575.1 | 368.7 |
| 35-2 | 24 | 134.6 | 526.2 | 341.0 |

The abrasive discs were evaluated using the Swing Arm Test. Results are reported in TABLE 5 (below).

TABLE 5

| Example | Disc Weight Loss, grams | Total Cut, grams |
|---|---|---|
| Comparative Example L-1 | 1.5 | 31.6 |
| Comparative Example L-2 | 1.5 | 32.4 |
| 32-1 | 0.9 | 32.9 |
| 32-2 | 0.8 | 31.6 |
| 33-1 | 1.1 | 32.9 |
| 33-2 | 1.3 | 33.8 |
| 34-1 | 1.7 | 29.2 |
| 34-2 | 1.8 | 33.8 |
| 35-1 | 1.5 | 30.8 |
| 35-2 | 1.5 | 32.1 |

Various unforeseeable modifications and alterations of this invention may be made by those skilled in the art without departing from the scope and spirit of this invention, and it should be understood that this invention is not to be unduly limited to the illustrative embodiments set forth herein.

What is claimed is:

1. A coated abrasive article comprising a backing and abrasive layer wherein the abrasive layer comprises abrasive particles and a binder comprising, based on the total weight of the components a) though e), a reaction product of a curable composition comprising:
    a) from 50 to 90 percent by weight of at least one epoxy rein preparable by reaction of epichlorohydrin with at least one of bisphenol A or bisphenol F;
    b) from 1 to 20 percent by weight of polyfunctional (meth)acrylate
    c) dicyandiamide;
    d) photoinitiator; and
    e) optional epoxy cure catalyst;
wherein the curable composition further comprises a novolac resin that is present in an amount of up to 25 percent by weight base an total weight of the curable composition.

2. A coated abrasive according to claim 1, wherein the binder is essentially free of dissolved thermoplastic polymer.

3. A coated abrasive according to claim 1, wherein the binder further comprises an epoxidized toughening agent that is present in an amount of up to 30 percent by weight, based on the total weight of the binder.

4. A coated abrasive according to claim 1, wherein the binder comprises up to 10 percent by weight of novolac resin, based on the total weight of the composition.

5. A coated abrasive according to claim 1, wherein the abrasive layer comprises make and size layers.

6. A coated abrasive according to claim 1, wherein the abrasive particles are dispersed in the binder.

7. A method of abrading a workpiece comprising:
    providing a coated abrasive article according to claim 1;
    frictionally contacting at least a portion of the abrasive layer with at least a portion of a surface of the workpiece; and
    moving at least one of the coated abrasive article or the workpiece relative to the other to abrade at least a portion of the surface.

8. A coated abrasive article comprising a backing and an abrasive layer, further comprising at least one of a presize layer, a saturant, a subsize, a backsize layer, or a tie layer comprising a binder that, based on the total weight of components a) through e), is a reaction product of a curable composition comprising:
    a) from 50 to 90 percent by weight of at least one epoxy resin preparable by reaction of epichlorohydrin with at least one of bisphenol A or bisphenol F;
    b) from 1 to 20 percent by weight of polyfunctional (meth)acrylate
    c) dicyandiamide;
    d) photoinitiator, and
    e) optional epoxy cure catalyst;
wherein the curable composition further comprises a novolac resin that is present in an amount of up to 25 percent by weight based on the total weight of the curable composition.

9. A coated abrasive according to claim 8, wherein the binder is essentially free of dissolved thermoplastic polymer.

10. A coated abrasive according to claim 8, wherein the binder further comprises an epoxidized toughening agent that is in an amount of up to 30 percent by weight, based on the total weight of the binder.

11. A coated abrasive according to claim 8, wherein the binder comprises up to 10 percent by weight of novolac resin, based on the total weight of the binder.

12. A coated abrasive according to claim 8, wherein the abrasive layer comprises make and size layers and abrasive particles.

13. A coated abrasive according to claim 12, further comprising a supersize.

14. A coated abrasive according to claim 8, wherein the abrasive particles are dispersed in a binder.

15. A method of abrading a workpiece comprising:
    providing a coated abrasive article according to claim 8;
    frictionally contracting at least a portion of the abrasive layer with at least a portion of a surface of the workpiece; and
    moving at least one of the coated abrasive article or the workpiece relative to the other to abrade at least a portion of the surface.

* * * * *

UNITED STATES PATENT AND TRADEMARK OFFICE
CERTIFICATE OF CORRECTION

PATENT NO.      : 6,843,815 B1
DATED           : January 18, 2005
INVENTOR(S)     : Thurber, Ernest L.

It is certified that error appears in the above-identified patent and that said Letters Patent is hereby corrected as shown below:

Column 2,
Lines 4 and 66, delete "," following "photoinitiator" and insert in place thereof -- ; --.

Column 3,
Line 55, delete "beating" and insert in place thereof -- heating --.

Column 5,
Line 10, delete "2-methyl-1-[4(methylthio)" and insert in place thereof -- 2-methyl-1-[4-(methylthio) --.
Line 19, delete "2-ethylantrraquinone" and insert in place thereof
-- 2-ethylanthraquinone --.

Column 6,
Line 14, delete "," following "these".

Column 10,
Line 36, delete "Cottringeret" and insert in place thereof -- Cottringer et --.

Column 12,
Line 8, delete "ANCAMNE" and insert in place thereof -- ANCAMINE --.

Column 15,
Line 67, delete "300400g/m$^2$" and insert in place thereof -- 300-400g/m$^2$ --.

Column 19,
Line 38, delete "though" and insert in place thereof -- through --.
Line 41, delete "rein" and insert in place thereof -- resin --.
Line 51, delete "base an" and insert in place thereof -- base on the --.

UNITED STATES PATENT AND TRADEMARK OFFICE
CERTIFICATE OF CORRECTION

PATENT NO. : 6,843,815 B1
DATED : January 18, 2005
INVENTOR(S) : Thurber, Ernest L.

It is certified that error appears in the above-identified patent and that said Letters Patent is hereby corrected as shown below:

Column 20,
Line 26, delete "," and insert in place thereof -- ; --.
Line 37, insert -- present -- following "that is".
Line 52, delete "contracting" and insert in place thereof -- contacting --.

Signed and Sealed this

Ninth Day of August, 2005

JON W. DUDAS
*Director of the United States Patent and Trademark Office*